United States Patent [19]

Duplessis et al.

[11] Patent Number: 4,828,781
[45] Date of Patent: May 9, 1989

[54] METHOD OF MOLDING COMPOSITE BICYCLE FRAMES

[76] Inventors: Delano A. Duplessis, 3 Lynne St., Van Buren, Me. 04785; Bevil J. Hogg, 215 Ross St., Santa Cruz, Calif. 05060

[21] Appl. No.: 66,435
[22] Filed: Jun. 26, 1987
[51] Int. Cl.⁴ .................. B29C 33/00; B29C 43/20
[52] U.S. Cl. .................. 264/250; 264/155; 264/257; 264/314; 264/337
[58] Field of Search .............. 264/257, 258, 314, 315, 264/316, 317, 319, 154, 325, 36, 155, 250, 337; 280/281 R, 281 B; 156/94, 95

[56] References Cited

U.S. PATENT DOCUMENTS

| | | |
|---|---|---|
| 2,182,828 | 12/1939 | Stutsman . |
| 2,370,726 | 3/1945 | Hess et al. . |
| 2,827,306 | 3/1958 | Roder . |
| 3,233,916 | 2/1966 | Bowden . |
| 3,375,024 | 3/1968 | Bowden . |
| 3,493,240 | 2/1970 | Jenks .................. 264/314 |
| 3,641,230 | 2/1972 | Jenks .................. 264/314 |
| 3,833,242 | 9/1974 | Thompson, Jr. . |
| 3,884,521 | 5/1975 | Moore . |
| 4,015,854 | 4/1977 | Ramond . |
| 4,230,332 | 10/1980 | Porsche . |
| 4,264,389 | 4/1981 | Staub et al. . |
| 4,471,020 | 9/1984 | McCarthy . |
| 4,479,662 | 10/1984 | Defour et al. . |
| 4,493,749 | 1/1985 | Brezina .................. 156/182 |
| 4,511,523 | 4/1985 | Hsu . |
| 4,513,986 | 4/1985 | Trimble . |
| 4,529,216 | 7/1985 | Spekner . |
| 4,565,595 | 1/1986 | Whitener . |
| 4,657,795 | 4/1987 | Foret . |

FOREIGN PATENT DOCUMENTS

| | | |
|---|---|---|
| 950982 | 9/1956 | Fed. Rep. of Germany . |
| 2455141 | 3/1975 | Fed. Rep. of Germany . |
| 877814 | 1/1943 | France . |
| 1163835 | 7/1986 | Japan .................. 264/280 |
| 3568 | of 1894 | United Kingdom . |
| 902 | of 1898 | United Kingdom . |
| 303619 | 11/1927 | United Kingdom . |
| 1361394 | 7/1974 | United Kingdom . |

Primary Examiner—James Lowe
Assistant Examiner—Jeremiah F. Durkin, II
Attorney, Agent, or Firm—Pollock, Vande Sande & Priddy

[57] ABSTRACT

A method of molding a generally hollow front triangle for a bicycle frame of composite materials, such as heat curable structural resins. Layers of the composite material are shaped to form a front triangle shell and this shell is compressed against a mold using at least one inflatable bladder routed to the outside through a passageway passing through a modified bottom bracket sleeve or a modified head tube sleeve.

21 Claims, 4 Drawing Sheets

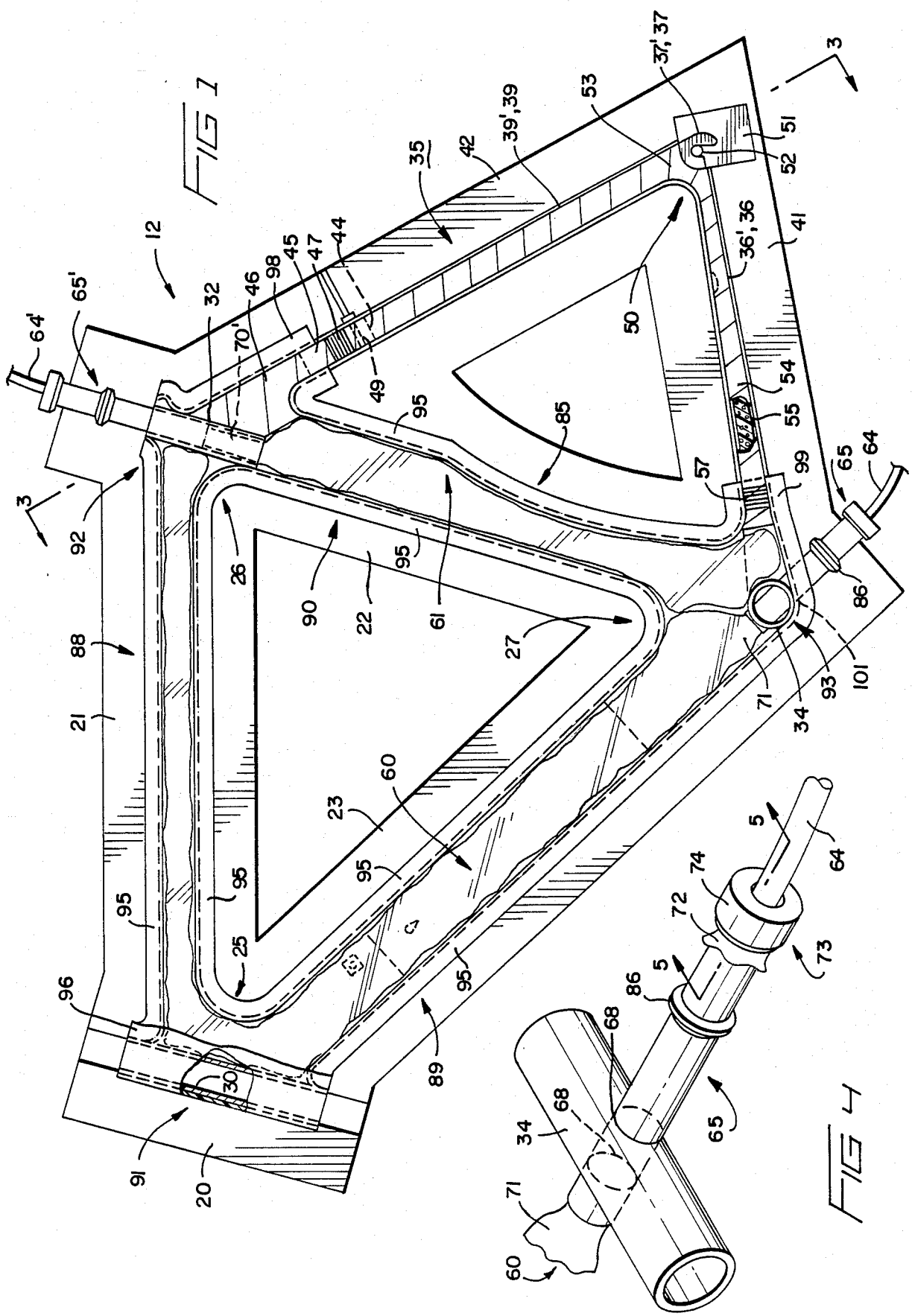

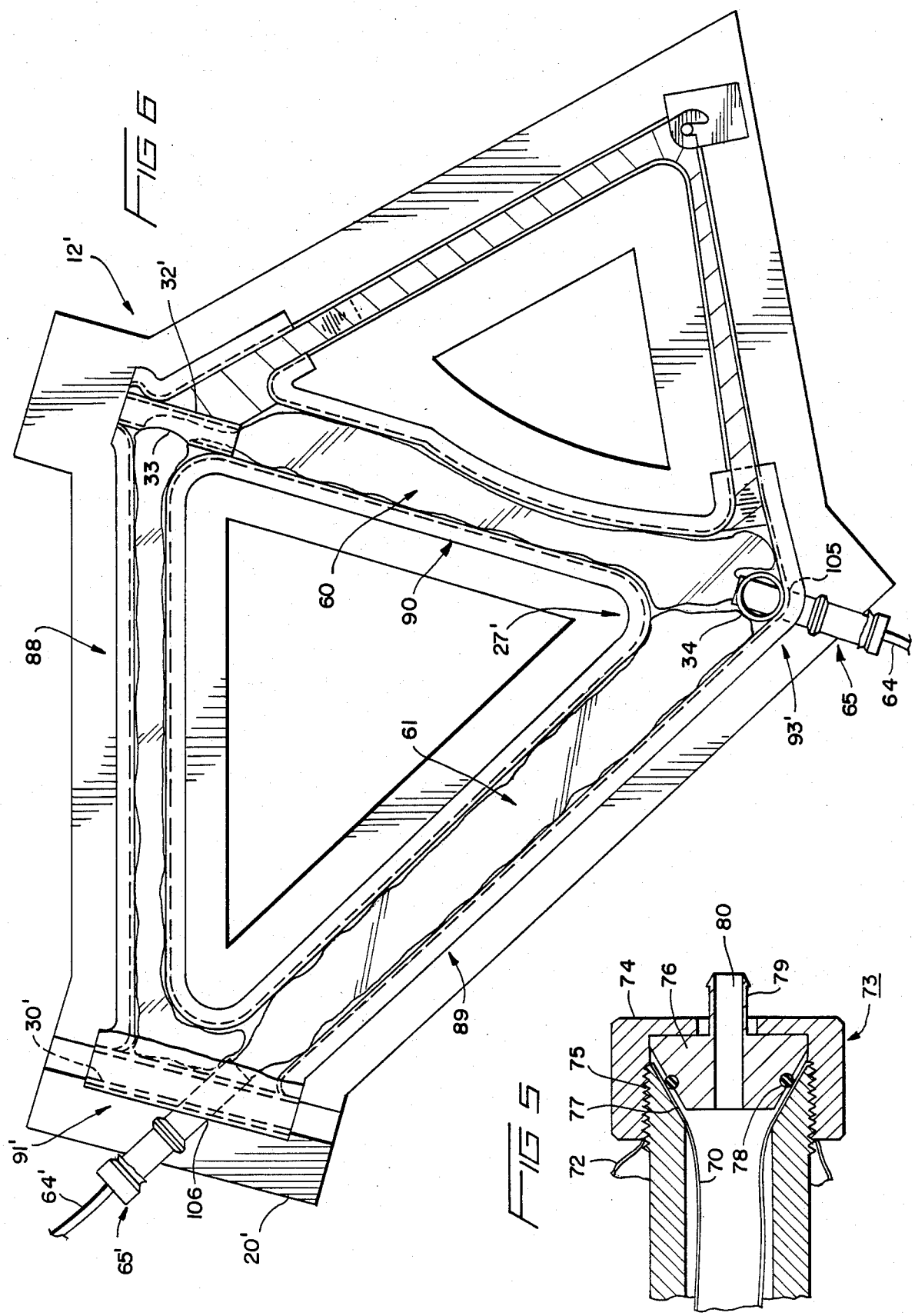

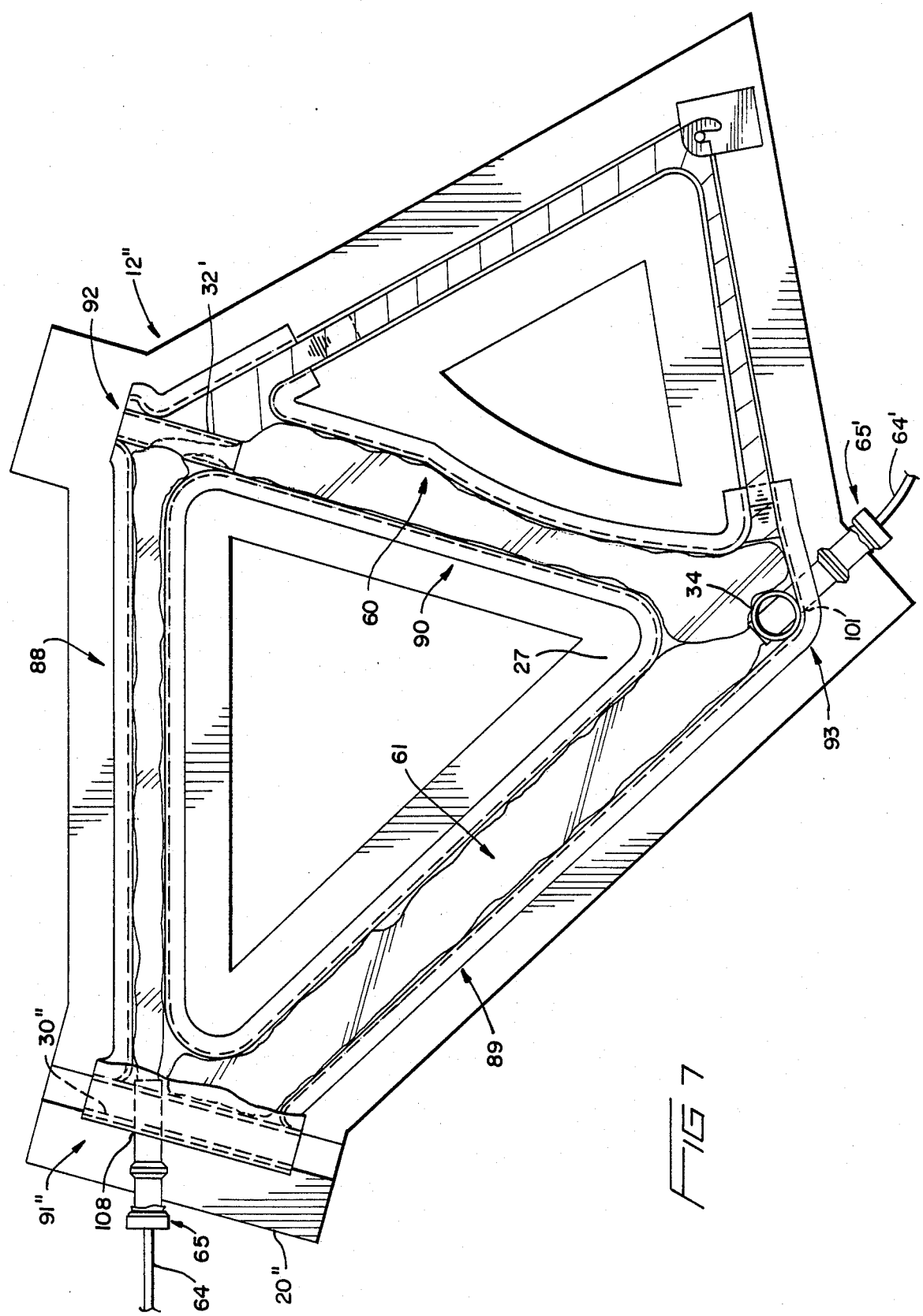

METHOD OF MOLDING COMPOSITE BICYCLE FRAMES

TECHNICAL FIELD

The present invention relates to methods of making bicycle frames. In particular, the present invention relates to a method of molding a generally hollow bicycle frame made from composite materials of fibers and synthetic resin.

BACKGROUND OF THE INVENTION

Conventional bicycle frames are assemblies built from individual tubes which are secured together by welding, brazing or by using other means for joining the tubes. In naming the structural components of bicycle frames, the individual frame tubes were designated by their location in relation to the other major components or assemblies used to make up the functioning bicycle. Thus, it was that the short frame tube which supported the handlebar assembly and the front wheel fork was referred to as the "head" tube, the tube which supported the seat and connected to the pedal axle support (the bottom bracket) was referred to as the "seat" tube, the tube which joined the top of the seat tube and the head tube was referred to as the "top" tube, the tube which descended from the head tube to the bottom bracket was referred to as the "down" tube, the pair of tubes which descended from the seat tube to the ends of the rear wheel axle, with one tube on either side of the rear wheel, were referred to as the "seat stays", and the pair of tubes which connected the bottom bracket to the ends of the seat stays at the rear wheel axle, with one tube on either side of the rear wheel, were referred to as the "chain stays".

The multiplicity of connections required to secure these individual structural parts together, combined with the different forces encountered by the bicycle as it is ridden, cause a variety of problems. It is not unusual, for example, for one or more of the joints or connections on a conventional bicycle frame to fail, making the entire frame unsuitable for use until the connection is repaired. For many frames, the cost of straightening the frame and repairing the connection is prohibitive.

Further, the individual tubes and associated joints are relatively heavy since the tubes are generally made by the extrusion of or by the rolling and seaming of a metal alloy, and the joints are generally made by welding or brazing these tubes together. The manufacture and assembly of these multiple structural parts is also time consuming and costly. Certain problems with conventional bicycle frames and their construction methods have been previously addressed. For example, U.S. Pat. No. 3,833,242 to Thompson, Jr. discloses a frame having a hard exterior skin molded as a unitary piece over a structural foam interior. The frame was constructed by techniques disclosed in U.S. Pat. Nos. 3,268,636 and 3,456,446 to Angell, Jr.

In addition, U.S. Pat. No. 4,513,986 to Trimble discloses a monocoque type frame having a stressed, unitary outer skin over internal stiffening ribs and other structural elements. Other molded frames and construction methods appear in U.S. Pat. Nos. 3,233,916; 3,375,024; 3,884,521; and 4,015,854, and in U.K. Patent No. 1,361,394.

These frames may provide advantages over conventional bicycle frames, due in some instances to increased strength and a reduced number of major structural joints. However, these frames generally require the interconnection of large number of interior structural support elements such as shear webs, reinforcing angles, reinforcing blocks and strips, and joining blocks, and/or the presence of structural foam in the interior to support the frame, thus sharing certain deficiencies with conventional frames. In addition, the construction methods employed therein are labor intensive and do not appear readily adaptable to efficient mass production.

Thus, it was perceived that some of the above problems could be remedied by a bicycle frame which is constructed from inexpensive, lightweight and strong composite materials.

Ideally, the frame would be easy to construct and adaptable to mass production techniques. It therefore was considered desirable to provide an improved method for producing a generally hollow bicycle frame made from resin composite materials.

DISCLOSURE OF THE INVENTION

The present invention provides an improved method for producing a generally hollow front triangle for a bicycle frame of composite materials. Preferably, the heat cured structural resin and/or fiber reinforced resin composite materials will be chosen so as to provide great strength combined with light weight. In certain preferred embodiments, the present method will produce front triangles for bicycle frames constructed using layers of heat curable resin-impregnated structural fibers such as fiberglass fibers, carbon fibers and/or KEVLAR fibers (a registered trademark of DuPont for its proprietary aromatic polyamide fibers). Preferred bicycle frames constructed in accordance with the methods of the present invention are described in PCT application Ser. No. 87/US/01093, filed in the name of Brent Trimble on May 12, 1987 and published as Wo 87/06901 Nov. 19, 1987, the entire contents of this application being incorporated herein by reference As disclosed in said PCT application Ser. No. 87/US/01093, a one-piece, strong, lightweight bicycle frame which is easy to construct and adaptable to mass production techniques can be molded from composite material to produce a unitary frame which does not require internal structural components. Such frames have portions generally corresponding to the components of a conventional bicycle frame and comprise a steering support means including a head tube portion, a seat support means, a pedal support means including a bottom bracket, a right and a left rear wheel support means, a top tube portion, a down tube portion, a seat tube portion, a right and a left chain stay portion and a right and a left seat stay portion, all constructed using structural resin which may include fiberglass or other reinforcing fibers usable to make composite materials, or combinations of these fibers.

The top tube portion, down tube portion and seat tube portion generally define an open front triangle. The steering support means is provided in a common hollow junction between the down tube portion and the top tube portion. The seat support means is provided in a common hollow junction between the seat tube portion and the top tube portion. The pedal support means is provided in a common hollow junction between the down tube portion and the seat tube portion. The right rear wheel support means is provided in a common junction formed between the right seat stay portion and the right chain stay portion, and the left rear wheel support means is provided in a common junction formed between the left seat stay portion and the left chain stay portion. In this specification, the hollow junction common to the top tube portion and the down tube portion is designated the head junction, the hollow junction common to the top tube portion and the seat tube portion is designated the seat junction, the hollow portion common to the seat tube portion and the down tube portion is designated the bottom bracket junction, the hollow junction common to the right chain and seat stays is designated the right stay junction, and the hollow junction common to the left chain and seat stays is designated the left stay junction.

A metal tube or fitting is placed in each common junction as a part of the support means to receive and support the appropriate bicycle component in the finished bicycle. Thus, the seat support means includes a metal seat post sleeve, the steering support means includes a metal head tube sleeve, each rear wheel support means includes a metal dropout, and the pedal support means includes a metal bottom bracket sleeve.

The major tubular portions of the front triangle, which are the seat tube portion, the down tube portion, and the top tube portion, and the hollow junction therebetween, may be formed by layering strips of resin impregnated fiber into the respective cavities of opposing mold pieces while they are separated. When the desired thickness is obtained, the separate mold pieces are brought together in opposing relationship to define the molding chamber(s).

The minor tubular portions, which are the chain stay portions and the seat stay portions, may, because of their small inner diameter, be formed by layering resin impregnated fabric around a solid foam core shaped to be the approximate size and shape of the hollow area within the finished stay. The minor portions may be united to each other outside of the mold to create the stay junctions between these portions. The minor portions then may be connected in the mold to the seat junction and the bottom bracket junction of the front triangle, thereby forming a rear triangle with the seat tube portion. The metal tubes and inserts are wrapped into the front and rear triangle components so as to be included in the various support means, by using strips or patches of resin impregnated fabric.

Following the laying up of a complete frame, the mold, preferably a three-piece mold, having an interior chamber which is the same size and shape as the exterior of the finished bicycle frame, is assembled and prepared for heat curing the frame.

In order to compress the layers of resin and fiber against the inside surface of the mold as the resin is heat cured, and thereby increase the density and strength of the bicycle frame walls, pressure is exerted from inside the hollow shell of composite material that is cured to form the frame. If sufficient pressure is not exerted, the frame will be defective and will not have the necessary structural strength.

For the major tubular portions of the front triangle, inflatable bladders are inserted in the relatively large hollow interiors of these portions and then inflated from the outside of the mold before and during the curing stage in order to compress the layers of composite material making up these portions against the inner surface of the mold. For the minor tubular portions, such as the stay portions, the foam core, which expands on heating, provides sufficient pressure to unite these portions with their common junctions and with the front triangle junctions to form a unitary frame structure.

Access to the bladders may be obtained through a necessary opening in the bicycle frame, such as that for receiving the head tube sleeve, the seat post sleeve or the bottom bracket sleeve. Thus, a bladder may ordinarily be placed in each major portion, with each bladder exiting from one end of the passage in each junction for receiving a sleeve. For example, the top tube portion bladder could exit from the passage which is provided in the head junction to accept the head tube sleeve, and the bladder in the down tube portion could exit from the passage which is provided in the pedal support means to accept the bottom bracket sleeve for the pedal axle.

The foregoing two arrangements are not generally desirable because a bladder exiting from the passage provided to accept the bottom bracket sleeve or from the passage provided to accept the head tube sleeve must follow a tortuous path and may be subjected to being bent at a sharp angle sufficient to expose the bladder membrane to collapse or kinks that can cause rupture when the bladder is inflated. Furthermore, it is preferable to have these sleeves fixed in place during molding of the frame. It is also desirable to reduce the number of bladders because pressure may not be evenly applied in the common junctions where discontinuous bladders abut each other. A need therefore exists for the method of the present invention which may be used to reduce the number of bladders required for the curing of composite bicycle frames, and to eliminate the sharp angle where the bladder exits at the pedal support means or the steering support means. The angles avoided may be as sharp as a right angle or even an acute angle.

In one embodiment, the present invention provides a method which uses inflatable bladders to compress layers of fiber reinforced resin against the interior surfaces of a mold during curing of the resin to form a front triangle comprising a top tube portion, a down tube portion, a seat tube portion and hollow junctions between these portions of a bicycle frame. In this embodiment, at least one inflatable bladder inside the uncured bicycle frame is accessed through a passageway in a modified bottom bracket junction, which forms a part of the pedal support means and includes a bottom bracket sleeve. This passageway permits the bladder to be inflated and, if desired, later removed in a generally straight line, thereby reducing the possibility of kinking and bladder rupture during inflation. The outer opening from the exterior of the frame into this bottom bracket passageway may, if desired, be patched or otherwise covered in the finished bicycle frame. The corresponding bladder may be removed or left in place since it is extremely light in weight.

In another embodiment, the present invention provides a method which employs two inflatable bladders to apply the necessary compression to the front triangle of the frame. In this embodiment, one of these bladders can be routed through the modified bottom bracket junction of the pedal support means, through either the down tube portion or the seat tube portion, and then along the top tube portion.

As alternatives to these embodiments, the head tube junction of the steering support means, which includes a head tube sleeve and corresponds generally to the head tube on a conventional bicycle frame, may be modified to provide a passageway for the inflation and, if desired, later removal of an inflatable bladder in a generally straight line from either the top tube portion or the down tube portion of the front triangle. For aesthetic reasons, the outer opening from the exterior of the frame into this head tube passageway is preferably patched or otherwise covered in the finished bicycle frame.

During construction of the front triangle of the bicycle frame, the passageway through the bottom bracket junction in substantial alignment with either the down tube portion or the seat tube portion, or the passageway through the head tube junction in substantial alignment with either the down tube portion or the top tube portion avoids a sharp angle bend in at least one of the bladders that would be required if this bladder was routed instead through the seat tube sleeve of the seat tube junction. The elimination of this bend reduces the possibility of kinking and bladder rupture during inflation. The bladder routing of the invention also eliminates routing multiple bladders or one extraordinarily long bladder through the seat tube sleeve, which also reduces the possibility of kinking and bladder rupture.

BRIEF DESCRIPTION OF THE DRAWINGS

A better understanding of the invention and its advantages will be apparent from the description below of specific embodiments taken in conjunction with the accompanying drawings in which:

FIG. 1 is a plan view with partial sections of the right side lay-up for a composite bicycle frame in the bottom piece of a mold, showing a modified bottom bracket sleeve within the pedal support means and corresponding placement of inflatable bladders in accordance with the invention;

FIG. 4 is a perspective view of a bladder mandrel passing through a modified bottom bracket sleeve in accordance with the invention;

FIG. 5 is a fragmentary sectional view along lines 5—5 of FIG. 4;

FIG. 6 is a plan view of the right side lay-up of a composite bicycle frame in the bottom piece of the mold, showing both a modified bottom bracket sleeve and a modified head tube sleeve and corresponding bladder placement in accordance with the invention; and, FIG. 7 is a plan view of the right side lay-up for a composite bicycle frame in the bottom piece of a mold, showing both a modified bottom bracket sleeve and an alternatively modified head tube sleeve and corresponding bladder placement in accordance with the invention.

DESCRIPTION OF BEST MODE AND OTHER EMBODIMENTS

Figure 2A:
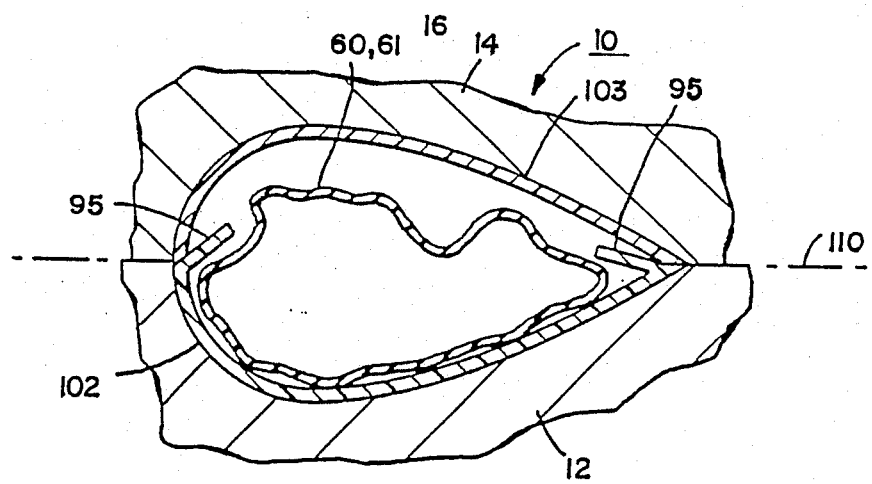
FIG. 2A is a fragmentary sectional view showing a bladder in a major portion of the front triangle of a bicycle frame shell with the top and bottom mold pieces in place before inflation of the bladder or curing of the resin in the shell.
Figure 2B:
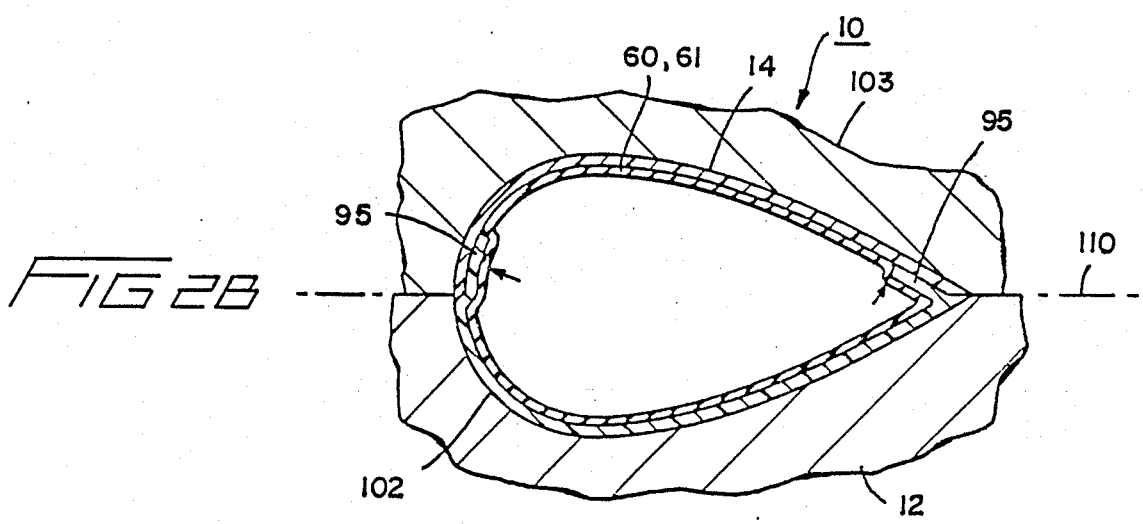
FIG. 2B is a fragmentary sectional view similar to FIG. 2, but in which the bladder has been inflated for curing of the resin in the shell.
Figure 3:
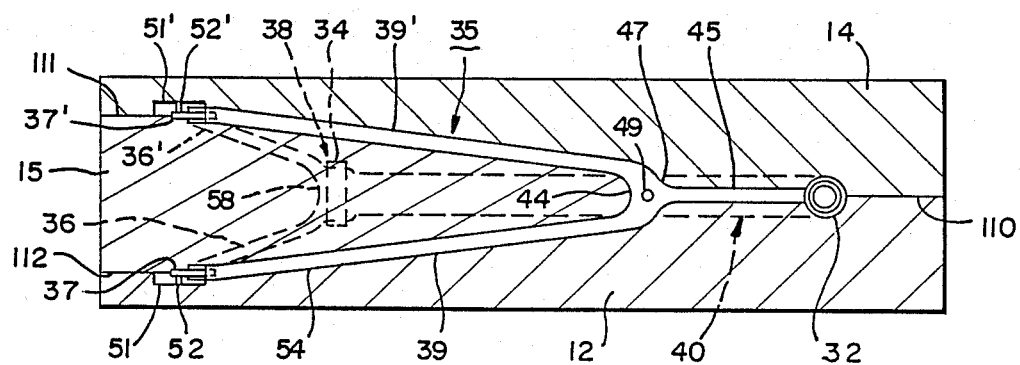
FIG. 3 is a sectional view along lines 3—3 of FIG. 1 with the top, bottom, and intermediate mold pieces all in place.

Referring particularly to FIGS. 1–3, there is shown a mold, generally designated 10, having a first or lower piece 12, a second or upper piece 14, and a third or intermediate piece 15 between the chain and seat stay cavities toward the rear of lower and upper pieces 12 and 14. For clarity, upper piece 14 is not shown in the plan views of FIGS. 1, 6 and 7. However, the cavities and other parts of upper mold piece 14 are a mirror image of the lower piece 12 shown in FIGS. 1, 6 and 7. Lower mold piece 12 and upper mold piece 14 together define a closed chamber 16 for molding the front triangle of a composite bicycle frame.

Both the upper and lower mold pieces have sections corresponding to the portions and junctions of a complete bicycle frame. Accordingly, lower frame piece 12 has a section 20 for molding a head tube portion, a section 21 for molding a top tube portion, a section 22 for molding a seat tube portion, and a section 23 for molding a down tube portion. A junction section 25 connects sections 21 and 23 for molding the head tube junction, a junction section 26 connects sections 21 and 22 for molding a seat tube junction, and a junction section 27 connects sections 22 and 23 for molding a bottom bracket junction. The head tube portion, the top tube portion, the seat tube portion and the down tube portion, together with the interconnecting common junctions, form a generally hollow front triangle for a bicycle frame.

The head tube junction includes a steering support means having a head tube sleeve 30 for rotatably receiving a shaft (not shown) carrying the handle bar assembly and front wheel fork. The seat tube junction includes a seat support means having a seat post sleeve 32 for receiving the post (not shown) of a seat assembly. The bottom bracket junction includes a pedal support means having a bottom bracket sleeve 34 for receiving the pedal axle (not shown).

For attachment to the front triangle to make a complete bicycle frame, there is placed in the lower mold piece 12 a rear triangle component, generally designated 35, for connecting the rear wheel assembly to the front triangle. As seen best in FIG. 3, rear triangle component 35 includes a right chain stay portion 36 for connecting the right side of the bottom bracket junction 38 with a right rear wheel support means having a right dropout 37, a left chain stay portion 36' for uniting the left side of the bottom bracket junction 38 with a left rear wheel support means having a left dropout 37', a right seat stay portion 39 for connecting the seat tube junction 40 and the right dropout 37, and a left seat stay portion 39' for connecting the seat tube junction 40 and the left dropout 37'.

Accordingly, the bottom mold piece 12 includes a corresponding outer right chain stay section 41 and an outer right seat stay section 42. The intermediate rear mold section 15 has a wedge-like shape to fit between the right and left side seat and chain stay portions as shown in FIG. 3 and provides inner mold walls for the spaced apart molding cavities which receive the portions of the rear triangle component for molding the corresponding right chain and seat stays and the left chain and seat stays, respectively, of the bicycle frame. The right and left seat stays come together at 44 and 47 to form a common stay piece 45 having an enlarged upper end 46 wrapped into the seat tube junction 40 as described further below. The right and left chain stays are feathered at 57 into bottom bracket junction 38 and are wrapped into this junction so as to be connected by an arch 58.

A junction section 50 of lower mold piece 12 forms a wheel axle junction for receiving the dropout 37.

Lower mold piece 12 includes a recess 51 having a pin 52 for keeping dropout 37 in position during the molding process. Upper mold piece 14 has a similar recess 51' having a pin 52' for keeping dropout 37' in position.

The chain stay portion 36 and the seat stay portion 39 when connected to bottom bracket junction 38 and seat tube junction 40 form a rear triangle with the down tube portion of the front triangle. In the embodiment shown, the chain stay portions and the seat stay portions are formed by wrapping layers of resin impregnated fabric 54 around solid foam cores 55 having the same shape and substantially the same size as the interior of the finished stay portions. When the solid foam cores 55 are heated, they will expand to compress the layers of fabric 54 against the inside surfaces of the corresponding sections of the molding chamber. Alternatively, the stay portions may comprise solid metal pieces or pieces of pre-cured solid resin which may be wrapped into the front triangle during the molding process described below, or which may later be secured to the finished front triangle by conventional joints, brackets or the like.

Because of their small size, the stay portions may be molded around foam cores which may be left in place without adding significantly to the weight of the bicycle frame. Because foam cores are relatively difficult to remove and would contribute significantly to the weight of the front triangle, the present invention employs air inflatable bladders 60 and 61 to compress the layers of the front triangle portions and junctions against the corresponding inside surfaces of the mold during heating of the mold for curing the resin.

Referring now to FIGS. 4 and 5, the bladder 60 is connected to an air supply hose 64 by a connector assembly, generally designated 65, having a tubular mandrel 67 passing through a pair of apertures 68—68 in bottom bracket sleeve 34. A conduit like extension 70 of the bladder is in fluid communication with the open end 71 of bladder 60 and passes through the cylindrical passageway on the inside of mandrel 67. The free end 72 of bladder extension 70 is clamped to the outer end of the mandrel by an airline connector 73 having a threaded female coupling 74 for engaging threads 75 on the outside of the mandrel and a conical clamping plug 76 for engaging a correspondingly tapered socket 77. The compression between the opposing conical surfaces of plug 76 and socket 77 securely clamps in place the free end 72 of bladder extension 70 as shown best in FIG. 5. The clamping plug 76 includes a nipple 79 to which the airline 64 is clamped by a conventional hose clamp (not shown), and a bore 80 which provides fluid communication between the clamped airline and the interior of bladder extension 70 which in turn is in fluid communication with the open end 71 of bladder 60. An O-ring seal 82 is preferably provided in an annular groove in the conical surface of plug 76 to provide a resilient sealing and clamping action between the opposing conical surfaces of plug 76 and socket 77. The free end of the bladder extension 70 may be folded back as shown or may be cut off at the outer edge of socket 77 so as not to pass back over the threads 75. The mandrel 67 includes an annular collar 86 for engaging a corresponding groove in the upper and lower mold pieces to hold the connector assembly 65 in the correct position relative to the molding chamber and bottom bracket sleeve 34. A second connector assembly 65' is used to connect bladder 61 to a second airline 64' through the axial passageway of the unmodified seat post sleeve 32.

A preferred way of practicing the method of the present invention will now be described with reference to FIG. 1. Strips of a composite material comprising multiple layers of fiber fabric pre-impregnated with a heat-curable resin are laid directly in the bottom half 12 of the mold to form a top tube lay-up 88, a down tube lay-up 89, and a seat tube lay-up 90. Shorter patches of the composite material are laid directly in the junction sections 25, 26 and 27 of mold piece 12 to form a head tube junction lay-up 91, a seat tube junction lay-up 92, and a bottom bracket junction lay-up 93, respectively. Corresponding left side strips and patches, which are not shown, are laid-up in the top mold half 14 to provide corresponding left side lay-ups for the top tube portion, the bottom tube portion, the seat tube portion and the connecting junctions which will form the left side of the frame when the mold pieces are brought together. The width of the strips and patches in the upper half 14 of the mold are about equal to half of the circumference of the correspondence finished frame portion, while the width of the strips in the lower half 12 of the mold are cut wider to allow for overlaps 95—95 on all sides for uniting the two halves of the front triangle component and for uniting the front and rear triangle components when the three pieces of the mold are brought together.

Metal inserts are then placed in lower mold piece 12 to provide the head tube sleeve 30, the seat post sleeve 32, and the bottom bracket sleeve 34. Prior to emplacement, these metal inserts may be wrapped in a patch of the composite material as illustrated by patch 96 around head tube sleeve 30. The pre-wrapped rear triangle component also is laid in place in bottom mold piece 12. The fluid bladders 60 and 61 are then placed in lower mold piece 12, the extension 70 of the longer bladder 60 being connected to airline 64 through the bottom bracket junction passageway provided by connector 65, and the extension 70' of the shorter bladder 61 being connected to airline 64' through the seat junction passageway provided by connector 65'.

After the fluid bladders are placed in the lower mold piece having the wider strips of material and wider patches, the overlaps 95 on each side are draped over the bladder as shown in FIG. 2A before the mold pieces are joined. Also before the mold pieces are joined, the seat ends of seat stay portions 39 and 39' are wrapped by the overlapping portions of seat junction patches, such as patch 98, and the bottom bracket ends of chain stay portions 36 and 36' are wrapped by the overlapping portions of bottom bracket patches, such as patch 99.

Following the insertion and overlapping of the bladders and the insertion and wrapping in of the sleeves and the chain and seat stay portions, the mold 10 is closed along lines of abutment 110, 111 and 112 and the mold pieces 12, 14 and 15 are clamped tightly together. The bladders 60 and 61 are then inflated to a pressure in the range of about 15 psig to about 500 psig, more preferably about 100 psig to about 200 psig, to compress the layers of uncured fiber reinforced resin against the interior surfaces of the mold as shown in FIG. 2B. Mold 10 is then heated to and kept at the temperature and for the period of the time recommended by the manufacturer to completely cure the resin of the composite material. Thus, as shown in FIG. 2B, the pressure exerted by bladders 60 and 61 compresses the overlaps 95—95 of the lower frame half 12 against the upper frame half 14, integrally sealing together the right and left sections 102 and 103, respectively, of the frame shell as the composite material of this shell cures within the mold.

Compression of the layers of composite material wrapped around the chain stay portions 36 and 36' and the seat stay portions 39 and 39' against the interior surfaces of the mold also will occur during heating of the mold due to the expansion of foam cores 55. Following completion of the cure, mold 10 is opened, the bladder connectors 65 and 65' are disconnected and removed, and the finished bicycle frame is removed from the mold. This removal of the frame from the mold is preferably done while the mold is still relatively hot to avoid possible difficulties in releasing the frame material from the mold.

The bladders 60 and 61 and the cores 55 may optionally be removed, the bladders being withdrawn straight through the corresponding connector during disassembly thereof, and the foam cores being dissolved in an appropriate solvent. However, because the bladders are extremely light and the amount of foam core material is relatively small, both the bladders and the cores may be left in place without appreciably affecting the final weight of the unitary bicycle frame. Furthermore, since the opening 101 in the exterior of the bottom bracket junction 38 is at a relatively hidden location, there is no real need to fill and/or cover the hole 101 for the aesthetic appearance of the frame.

As shown in FIG. 6, the long bladder 60 may be routed from a modified head tube lay-up 91', through the top tube lay-up 88, through seat post sleeve 32 and seat tube lay-up 90, to a frame exterior opening 105 in a modified bottom bracket layup 93'. This modification of the bottom bracket lay-up 93' and bottom junction mold section 27' permits the extension 70 of bladder 60 to exit in a generally straight line relative to seat tube lay-up 90. The mold 12' and the bottom bracket lay-up 93' have been modified to align the apertures 68—68 of bottom bracket sleeve 34 with the seat tube lay-up 90 instead of the down tube lay-up 89 as in FIG. 1. The head tube mold section 20' and the head tube junction lay-up 91' have been modified to permit the second, shorter bladder 61 to exit in a generally straight line from down tube lay-up 89 through a frame exterior opening 106 in modified head tube lay-up 91'.

Thus, when the sleeve 34 is wrapped into the bottom bracket junction as the frame is built, the transverse apertures 68—68 may be aligned with either the seat tube lay-up 90 as shown in FIG. 6, or sleeve 34 may be rotated so as to align apertures 68—68 with the down tube lay-up 89 as shown in FIG. 1. Either of these positions allow a bladder in the corresponding lay-up to exit the frame and the mold in substantially a straight line. The bottom bracket sleeve, as well as the seat post and head tube sleeves, may be made of metal or plastic, and the necessary apertures may be provided therein by drilling a hole through both sides of the cylindrical sleeve. Whereas the longitudinal axes of the head tube and the seat tube are in the symmetrical plane of the bicycle frame in which the wheels rotate, the longitudinal axis of the bottom bracket sleeve 34 runs substantially perpendicular to this plane of symmetry. The connector apertures 68—68 of the bottom bracket sleeve 34, as well as the corresponding connector apertures in modified head tube sleeves 30' and 30", are also aligned with this plane of symmetry of the bicycle frame.

Referring now to FIG. 7, the shorter bladder 61 may be arranged in the down tube lay-up 89 so as to exit in a generally straight line through the frame exterior opening 101, which is in the same position as in FIG. 1 but in this embodiment is penetrated by the short bladder connector 65' instead of the long bladder connector 65. The longer bladder 60 is routed from the bottom bracket junction lay-up 93 through the seat tube lay-up 90, through the seat post sleeve 32, through the top tube lay-up 88, to a frame exterior opening 108 in a modified head tube lay-up 91". The head tube lay-up 91" and the head junction section 20" of lower mold piece 12" have been modified so that the connector 65 of long bladder 60 exits through a modified head tube sleeve 30" in a generally straight line with the top tube lay-up 88.

It is evident from the foregoing that long bladder 60 will always bend through an acute angle at an intermediate position between its closed and open ends. The acute angle bend of the long bladder could be eliminated by using three separate bladders which respectively exit the mold through the seat post sleeve 32 and the modified bottom bracket sleeve 34 of FIG. 1 and the modified head tube sleeve 30" of FIG. 7. However, this three bladder arrangement is not desirable because a stronger frame will be obtained by reducing, as far as possible, the number of bladders used to provide internal pressure in the frame as it cures. This is because compression of the fiber reinforced resin layers against the inside surfaces of mold 10 at the common junctions between the elongated tube portions of the frame may be applied more uniformly by a bladder which passes entirely through a junction. In addition, the modified head tube arrangements of FIGS. 6 and 7 may be less desirable than the bladder exiting arrangement of FIG. 1 for aesthetic reasons, because an opening in the exterior of the frame at the head tube is in an exposed location and therefore must usually be patched or otherwise covered.

Thus, using one long bladder entering the seat tube sleeve 32 would be ideal except that the acute angles between the seat tube portion and the down tube portion and between the down tube portion and the top tube portion are usually so acute that the combination of bends required by this method of routing may cause crimping or collapse of segments of this extraordinarily long bladder, resulting in either rupture or failure to fully inflate. Therefore, for most frame configurations, the presently preferred methods employ the two bladders 60 and 61.

One could, of course, construct and use in lieu of a standard straight bladder, a single triangular shaped bladder with an exiting extension through the seat tube sleeve 32 similar to the valve of an inner tube for an automobile or bicycle tire. However, such a one-piece bladder is undesirable because it would be expensive to make and a different size triangular bladder would have to be used for each different frame size. Such a bladder also would be extremely difficult to remove from the frame after it is cured. In addition, it would be difficult to use such a triangular bladder if one or more of the tube portions are pre-shaped on a mandrel in accordance with the alternative method described below.

As an alternative to laying-up the complete front triangle in the mold as shown in FIGS. 1, 6 and 7, one or more individual portions of the frame, such as the top tube portion, the down tube portion, and/or the seat tube portion, may be pre-wrapped and then united with patches of composite material to form an uncured front triangle shell. The portions of this shell might be united entirely outside of the mold and the united shell then placed in the mold along with the pre-wrapped seat stay and chain stay portions. For example, a top tube portion, a seat tube portion, and a down tube portion may be pre-wrapped by wrapping resin impregnated fabric of composite fibers on a mandrel having the approximate shape and size of the interior cavity of a finished front triangle. The tubular portions wrapped on mandrels are removed in an uncured state and the individual portions of the front triangle are united with junction patches to provide an uncured shell for forming the front triangle of the bicycle frame. Before the individual portions of the frame are united, the inflatable bladders 60 and 61 are inserted into and pulled through the top tube portion, the seat tube portion and the down tube portion. As the portions of the frame are united, the metal sleeves 30, 32 and 34 are inserted and held in place using the resin impregnated fabric patches for the common hollow junctions. During or after the uniting of the individual portions, exterior openings are provided through the uncured frame shell for exiting the bladder extensions through drilled apertures in the corresponding sleeves so that the bladder extensions may be connected to an airline through the connector 65 or 65'.

One skilled in the art will recognize that it would be possible to construct the front triangle frame component from a variety of materials and to modify the method of making this component in ways other those described above. While the best mode of the method of the application has been described in detail, and shown in the accompanying drawings, this is only one specific example of the invention and it will be evident that various modifications, other than those also described, are possible without departing from the scope of the invention.

What is claimed is:

1. A method of molding a generally hollow front triangle for a bicycle frame, said front triangle comprising a hollow top tube portion, a hollow down tube portion, a hollow seat tube portion, a hollow head junction connecting said top tube portion and said down tube portion, a hollow seat junction connecting said top tube portion and said seat tube portion, and a hollow bottom bracket junction connecting said down tube portion and said seat tube portion, said head junction containing a steering support means having a head tube sleeve, said seat junction containing a seat support means having a seat post sleeve, and said bottom bracket junction containing a pedal support means having a bottom bracket sleeve, said method comprising the steps of:

forming a hollow shell having at least one layer of an uncured structural resin and fiber composition and placing said uncured shell adjacent to the inside surfaces of the walls of a mold defining a molding chamber having an interior shape corresponding to the exterior shape of said front triangle, said shell having a generally continuous hollow interior and tube portions and junctions corresponding to said front triangle;

placing said head tube and bottom bracket sleeves within a surrounding wall of their respective junctions and transversely to corresponding ends of the connected tube portions;

forming a passageway passing transversely through at least one of the bottom bracket sleeve of said pedal support means and the head tube sleeve of said steering support means and through said wall of the corresponding junction(s), said passageway having an opening to the outside in the exterior of the shell;

placing in the hollow interior of said shell at least one elongated inflatable bladder for compressing said at least one layer of said structural resin and fiber composition against the inside surfaces of said molding chamber, said at least one bladder being closed at one end and open at the other end and having an extension in fluid communication with said open end;

routing said bladder extension to the outside of the shell and the mold through said passageway and said opening, said passageway and said opening being substantially aligned with the portion of said shell containing said open end of said bladder;

inflating said at least one bladder with a fluid to compress said at least one layer of said structural resin and fiber composition against the inside surfaces of said molding chamber, said fluid communicating with said at least one bladder through said bladder extension; and, curing said structural resin to form said hollow front triangle.

2. The method of claim 1 in which said at least one bladder is routed to the outside of the frame through a passageway through said bottom bracket sleeve.

3. The method of claim 2 which further comprises the steps of deflating said at least one bladder, and affixing a patch to said cured frame to cover the opening of said passageway in the exterior of said frame.

4. The method of claim 3 in which said deflated bladder is removed from said cured front triangle through said passageway before said opening is covered by said patch.

5. The method of claim 2 in which said passageway is substantially aligned with said seat tube portion.

6. The method of claim 5 in which said at least one bladder is routed through said top tube portion and said seat tube portion to the outside of said frame through said passageway.

7. The method of claim 2 in which said passageway is substantially aligned with said down tube portion.

8. The method of claim 7 in which said at least one bladder is routed through said top tube portion and said down tube portion to the outside of said frame through said passageway.

9. The method of claim 1 in which said at least one bladder is routed to the outside of the frame through a passageway through said head tube sleeve.

10. The method of claim 9 which further comprises the steps of deflating said at least one bladder, and affixing a patch to said cured frame to cover the opening of said passageway in the exterior of said frame.

11. The method of claim 10 in which said deflated bladder is removed from said cured front triangle through said passageway before said opening is covered by said patch.

12. The method of claim 9 in which said passageway is substantially aligned with said top tube portion.

13. The method of claim 12 in which said at least one bladder is routed through said seat tube portion and said top tube portion to the outside of said frame through said passageway.

14. The method of claim 9 in which said passageway is substantially aligned with said down tube portion.

15. The method of claim 1 in which said inflating step includes connecting said bladder extension to connector means for connecting said at least one bladder to a source of said fluid under pressure, said connector means comprising a hollow mandrel member having means for positioning said mandrel member in said mold relative to at least one of said bottom bracket sleeve and said head tube sleeve, said mandrel member being open at one end for receiving said bladder extension and having means at the other end for clamping the exterior of said bladder extension to said mandrel member and placing the interior of said bladder extension in fluid communication with said source of pressurized fluid.

16. The method of claim 15 in which said clamping means includes seal means for providing a fluid tight seal between said fluid communication means and the interior of said bladder extension.

17. The method of claim 15 which further comprises routing said bladder extension through an elongated section of said mandrel member disposed in said passageway and extending through at least one of said bottom bracket sleeve and said head tube sleeve.

18. The method of claim 15 which further comprises clamping a section of said bladder extension between opposing clamping surfaces, one on said other mandrel end and the other on a plug part of said clamping means.

19. The method of claim 18 in which said clamped section is adjacent an open end section of said bladder extension, and wherein said method further comprises folding said open end section backward over a threaded exterior surface of said other mandrel end and screwing a threaded female coupling part of said clamping means onto said threaded exterior surface over said open end section.

20. The method of claim 19 in which said plug part and said female coupling are separate pieces.

21. The method of claim 18, in which said clamping means includes seal means for providing a fluid-tight seal between said fluid communication means and the interior of said bladder extension, and in which each of said clamping surfaces is conical and said seal means is carried on one of said conical clamping surfaces.

* * * * *